United States Patent
Ito et al.

(10) Patent No.: US 9,008,434 B2
(45) Date of Patent: Apr. 14, 2015

(54) FEATURE EXTRACTION DEVICE

(75) Inventors: Satoshi Ito, Kanagawa (JP); Susumu Kubota, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 119 days.

(21) Appl. No.: 13/422,038

(22) Filed: Mar. 16, 2012

(65) Prior Publication Data
US 2012/0177293 A1 Jul. 12, 2012

Related U.S. Application Data

(63) Continuation of application No. PCT/JP2009/066401, filed on Sep. 18, 2009.

(51) Int. Cl.
G06K 9/00 (2006.01)
G06T 7/00 (2006.01)
G06T 7/40 (2006.01)

(52) U.S. Cl.
CPC ............... *G06T 7/0085* (2013.01); *G06T 7/404* (2013.01)

(58) Field of Classification Search
None
See application file for complete search history.

(56) References Cited

U.S. PATENT DOCUMENTS

| | | | | |
|---|---|---|---|---|
| 4,969,202 A * | 11/1990 | Groezinger | 382/199 |
| 5,627,908 A * | 5/1997 | Lee et al. | 382/133 |
| 6,246,790 B1 * | 6/2001 | Huang et al. | 382/162 |
| 6,377,711 B1 * | 4/2002 | Morgana | 382/274 |
| 6,845,178 B1 * | 1/2005 | Evans et al. | 382/216 |
| 7,764,839 B2 * | 7/2010 | Abe | 382/199 |
| 7,929,775 B2 * | 4/2011 | Hager et al. | 382/224 |
| 2003/0053707 A1 * | 3/2003 | Bhattacharjya | 382/260 |
| 2003/0103665 A1 * | 6/2003 | Uppaluri et al. | 382/131 |
| 2004/0170318 A1 | 9/2004 | Crandall et al. | |
| 2006/0153451 A1 * | 7/2006 | Hong et al. | 382/173 |
| 2008/0031506 A1 * | 2/2008 | Agatheeswaran et al. | 382/132 |
| 2008/0212887 A1 * | 9/2008 | Gori et al. | 382/248 |
| 2008/0285853 A1 * | 11/2008 | Bressan | 382/169 |
| 2008/0292194 A1 * | 11/2008 | Schmidt et al. | 382/217 |
| 2010/0034459 A1 | 2/2010 | Ito et al. | |

(Continued)

FOREIGN PATENT DOCUMENTS

JP 2004-265407 9/2004

OTHER PUBLICATIONS

Hee-Kooi Khoo, Hong-Choon Ong, Ya-Ping Wong. "Image Texture Classification using Combined Grey Level Co-occurrence Probabilities and Support Vector Machines" Fifth International Conference on Computer Graphics, IEEE, 2008.*

(Continued)

*Primary Examiner* — Jon Chang
*Assistant Examiner* — Oneal R Mistry
(74) *Attorney, Agent, or Firm* — Amin, Turocy & Watson, LLP (57) ABSTRACT

According to one embodiment, a feature extraction device includes an obtaining unit that obtains image data having a plurality of pixels. The device includes a pixel feature calculation unit that calculates first pixel features and second pixel features of each of the pixels, which are different from each other, and a classification unit that classifies a pair of pixels by using the first features for at least some of the plurality of pixels. The device includes a co-occurrence frequency calculation unit that calculates a co-occurrence frequency representing a frequency of co-occurrence of the second pixel features of the first pixel and the second pixel features of the second pixel for the set for which a result of the classification by the classification unit is consistent.

4 Claims, 9 Drawing Sheets

(56) References Cited

U.S. PATENT DOCUMENTS

2010/0034465 A1 2/2010 Watanabe et al.
2010/0223276 A1* 9/2010 Al-Shameri et al. .......... 707/769

OTHER PUBLICATIONS

International Search Report for International Application No. PCT/JP2009/066401 mailed on Oct. 27, 2009.
Written Opinion for International Application No. PCT/JP2009/066401.
Watanabe, Tomoki, et al; "Co-occurrence Histograms of Oriented Gradients for Pedestrian Detection", the 3rd Pacific-Rim Symposium on Image and Video Technology, LNCS 5414, 2009, pp. 37-47.
Ando, Yuuki, et al.; "Proposing Co-occurrence Frequency Image and CFI-based Filters", The Institute of Electric Engineers of Japan Kenkyukai Shiro, The Papers of Joint Technical Meeting on Information Processing and Information Oriented Industrial, Aug. 11, 2007, Joho Shori Kenkyukai IP-07-14-21, pp. 7-12.
Jia, Wenjing, et al.; "IMage Matching using Colour Edge Coocurrence Histograms", 2006, IEEE International Conference on Systems, Man, and Cybernetics, Oct. 8-11, 2006, Taipei, Taiwan, pp. 2413-2418.

* cited by examiner

IMAGE DATA

T: CONSISTENT
F: INCONSISTENT

SET OF PIXELS FOR WHICH CO-OCCURRENCE RELATION IS TO BE EXAMINED

SCAN PIXELS WITHIN TARGET REGION

PIXELS DETERMINED TO BE INCONSISTENT AND USED FOR CALCULATION OF CO-OCCURRENCE FREQUENCY

FIG.11

CO-OCCURRENCE HISTOGRAM 1

CO-OCCURRENCE HISTOGRAM 2

CO-OCCURRENCE HISTOGRAM M

FEATURE EXTRACTION DEVICE

CROSS-REFERENCE TO RELATED APPLICATIONS

This application is a continuation of PCT international application Ser. No. PCT/JP2009/066401 filed on Sep. 18, 2009, which designates the United States; the entire contents of which are incorporated herein by reference.

FIELD

Embodiments described herein relate generally to a feature extraction device.

BACKGROUND

Features robust to misregistration of a target object and illumination variation can be extracted by calculating a plurality of co-occurrence histograms of oriented gradients from image data (see Tomoki Watanabe, Satoshi Ito, and Kentaro Yokoi, "Co-occurrence Histograms of Oriented Gradients for Pedestrian Detection," The 3rd Pacific-Rim Symposium on Image and Video Technology, LNCS 5414, pages 37-47, 2009). According to this technology, features that are effective for detecting a target object such as a pedestrian can be extracted, for example.

According to "Co-occurrence Histograms of Oriented Gradients for Pedestrian Detection," however, since pixels in the image data are handled uniformly, the discrimination power of features is not sufficient when a plurality of target objects are included or when a foreground and a background are present in an image represented by the image data.

DETAILED DESCRIPTION

In general, according to one embodiment, a feature extraction device includes an obtaining unit that obtains image data having a plurality of pixels. The device includes a pixel feature calculation unit that calculates the first pixel feature and the second pixel feature of each of the pixels, which are different from each other, and a classification unit that classifies a pair of pixels by using the first features for at least some of the plurality of pixels. The device includes a co-occurrence frequency calculation unit that calculates a co-occurrence frequency representing a frequency of co-occurrence of the second pixel feature of the first pixel and the second pixel features of the second pixels for the set for which a result of the classification by the classification unit is consistent.

Embodiments of a feature extraction device will be described below in detail with reference to the accompanying drawings.

[First Embodiment]

First, a hardware configuration of a feature extraction device according to this embodiment will be described referring to FIG. 1. A feature extraction device 50 includes a control unit 50A configured to control the entire device, a main storage unit 50B configured to store various data and various programs, an auxiliary storage unit 50C configured to store various data and various programs, and a bus that connects these units. This is a hardware configuration using a common computer system. In addition, a communication interface (I/F) 50D configured to control communication with external devices is connected to the feature extraction device through wired or wireless connections.

Next, description will be made on various functions implemented by executing various programs stored in the main storage unit 50B and the auxiliary storage unit 50C by the control unit 50A of the feature extraction device with such a hardware configuration. The control unit 50A includes an obtaining unit 51, a pixel feature calculation unit 52, a classification unit 53, a co-occurrence frequency calculation unit 54 and an output unit 55. The functions of these units are implemented by executing various programs stored in the main storage unit 50B and the auxiliary storage unit 50C by the control unit 50A.

The obtaining unit 51 obtains image data to be processed and stores the same in the main storage unit 50B. An image represented by the image data to be processed may be an image in which each pixel has only one value such as a grayscale image, or may be a multichannel image in which each pixel has a plurality of values, such as a color image and a multispectrum image used for satellites and the like. The image data are not limited to a visible light image, an infrared image, an X-ray image, an ultrasonic image, a range image and the like, but may be any representation as an image such as a result of imaging output values of a tactile sensor. Furthermore, the image data to be processed may be stored in the auxiliary storage unit 50C in advance and obtained by reading therefrom, or may be transmitted from an external device and obtained by receiving the transmission via the communication I/F 50D.

Figure 2:
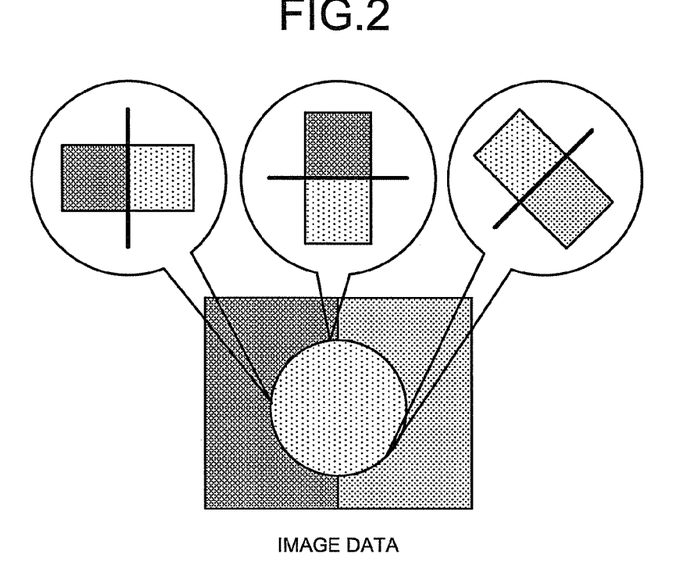
FIG. 2 is a diagram illustrating an example of a case where first pixel feature data are calculated.

The pixel feature calculation unit 52 calculates first pixel features and second pixel features that are different from each other for each of pixels of the image data obtained and stored in the main storage unit 50B by the obtaining unit 51. The first pixel features and the second pixel features may be pixel values that are values of each pixel, grayscale values, gradient directions, edge directions, or cluster numbers to which the pixels belong obtained by applying a clustering technique such as the k-means method to grayscale values. The clustering may be performed not only on grayscale values but also on grayscale patterns including the vicinity of pixels, color patterns, and descriptors such as those of scale invariant feature transform (SIFT) as proposed in D. G. Lowe, "Distinctive Image Features from Scale-Invariant Keypoints", International Journal of Computer Vision (2004), for example. Alternatively, instead of clustering, a classification technique such as one proposed in Shotton et al., "TextonBoost: Joint Appearance, Shape and Context Modeling for Multi-Class Object Recognition and Segmentation", in Proceedings of the European Conference on Computer Vision (2006), pp. 1-15 may be used to classify a pixel, and a category number to which the pixel belongs obtained as a result of the classification may be used as the first pixel features or the second pixel features. However, since the co-occurrence frequency calculation unit 54, which will be described later, calculates the co-occurrence frequency of the second pixel features, the second pixel features are preferably discrete values. If the calculated second pixel features are continuous values, the second pixel features need to be quantized into discrete values. In addition, the first pixel features may be adaptively calculated according to the second pixel features. FIG. 2 is a diagram illustrating an example of a case where an edge direction is used as the second pixel features, and the first pixel features are calculated from pixels or regions located in a direction different from the edge direction. In this case, the first pixel features may be calculated from a pixel or a region that is farther from the edge. Obviously, the first pixel features may be adaptively calculated according to features other than the second pixel features.

The classification unit 53 performs, on all the pixels within a target region set in the image data obtained by the obtaining unit 51, a classification process of classifying a set of one pixel within the target region and one or more other pixels in the image data, between which a co-occurrence relation is to be examined, by using the first pixel features calculated by the pixel feature calculation unit 52.

Figure 3:
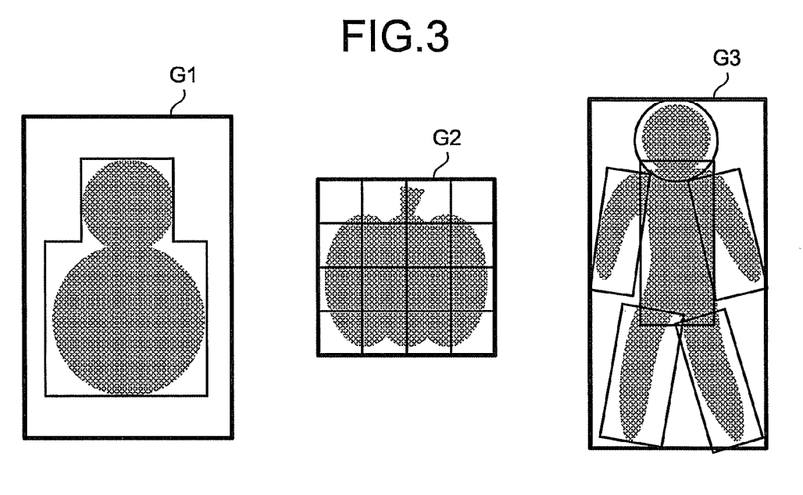
FIG. 3 is a diagram illustrating examples of setting target regions.

The target region is set in advance regardless of the image data, and may be set, in this case, using previous knowledge (such as knowledge that a person can be divided into head, trunk, arm and leg parts) on the shape of a target object. FIG. 3 is a diagram illustrating examples of setting target regions. Only one target region is set in an image G1, while a plurality of target regions is set in images G2 and G3 illustrated in FIG. 3. In addition, different target regions overlap with each other in the image G3. The shapes of target regions are not limited to rectangles and may be any shape such as a circle. Note that, when a plurality of target regions is set, the classification process is performed on each target region, and the co-occurrence frequency calculation unit 54 calculates each co-occurrence frequency of the second pixel features using the result of the classification process.

Note that the pixels with which the co-occurrence relation of the one pixel included in the target region is to be examined are located at predetermined distances in predetermined directions from the one pixel, and the position coordinates are obtained by mapping, for example. When the image data obtained by the obtaining unit 51 is represented by I(r) (r is a variable representing image coordinates), position coordinates of a pixel included in a target region are represented by r0, position coordinates of N pixels included in the image data I(r) are represented by r1, . . . , rN, the relation of these coordinates is given by an equation 1 using g1, . . . , gN that are mappings from position coordinates to position coordinates.

$$r_i = g_i(r_0) \text{ for } i=1,\ldots,N \quad (1)$$

Figure 4:
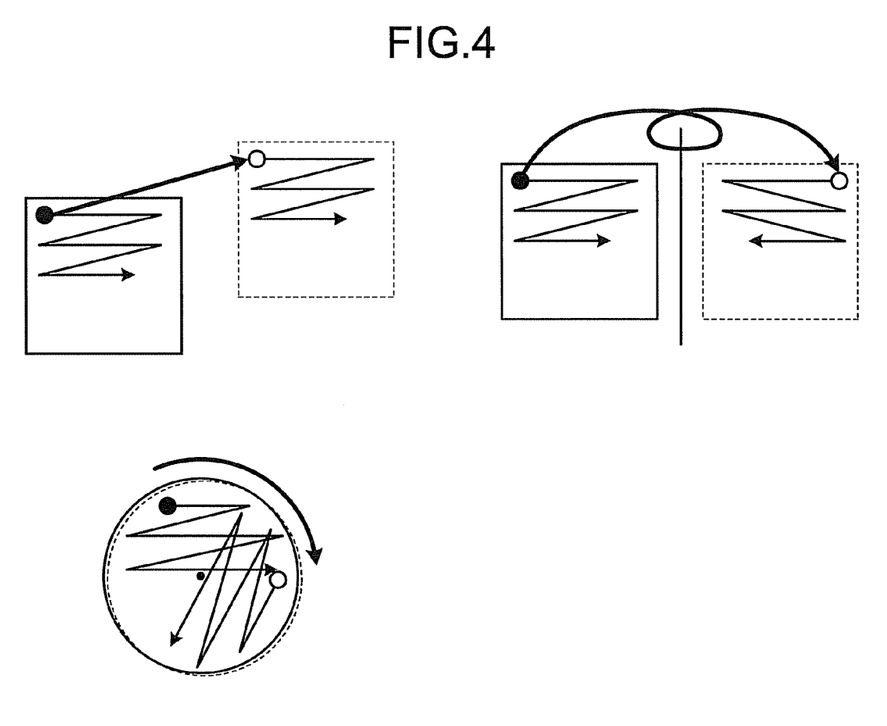
FIG. 4 is a diagram illustrating examples of parallel translation, inversion and rotation.

Note that affine transformation, for example, can be used for mapping gi. The affine transformation is a mapping combining parallel translation, rotation, inversion, scaling, shearing and the like. FIG. 4 is a diagram illustrating examples of parallel translation, inversion and rotation. Any non-linear mapping other than the affine transformation such as projective transformation may be used for the mapping gi. If the calculation cost for the function of the mapping gi is large, a table of position coordinates before and after the mapping or differences between the position coordinates may be prepared in advance and the mapping may be performed by using the values therein instead of calculating the function at each mapping. In addition, if position coordinates ri=gi(r0) after the mapping are not included in the image data, the pixel corresponding to the coordinates r0 excluded in advance from the target region.

Figure 5:
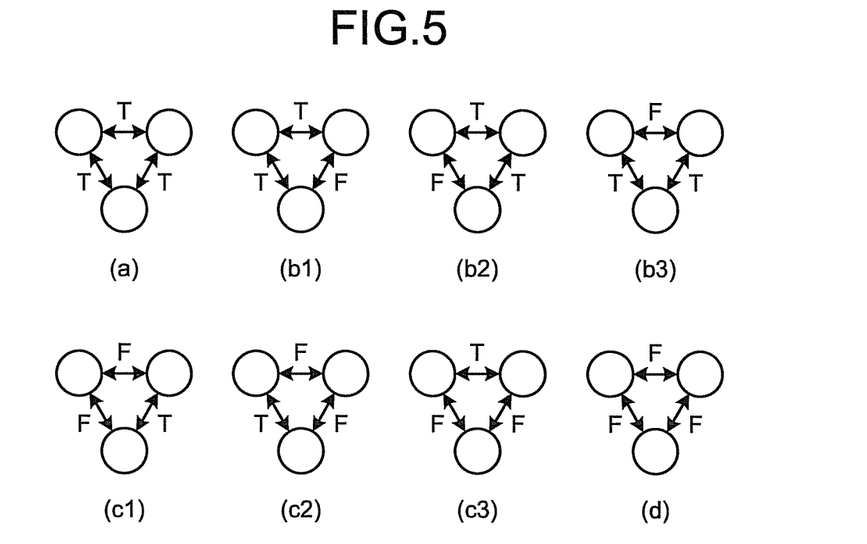
FIG. 5 is a diagram illustrating an example of results of consistency determination on three pixels.

For the classification process, a cluster number obtained by applying a well-known clustering technique such as the k-means method to the first pixel features may be used, a category number obtained by applying a well-known classification technique such as the support vector machine may be used, or a result of determining consistency of the first pixel features may be used, for example. The simplest case in which a set of pixels is composed of two pixels (position coordinates thereof are assumed to be r0 and r1) and the classification process is to determine consistency between the first pixel feature f1(r0) and the first pixel feature f1(r1) of the two pixels is assumed. In this case, the result of the classification process can be either of two values, which are consistent and inconsistent. When the first pixel features are qualitative values such as cluster numbers or category numbers, it is determined to be consistent if f1(r0)=f1(r1) is satisfied or to be inconsistent otherwise. On the other hand, when the first pixel features are quantitative values such as grayscale values or color patterns, it is determined to be consistent if a scalar product of f1(r0) and f1(r1) is larger than a predetermined threshold or to be inconsistent otherwise, for example. An inverse of a Euclidean distance or a cosine may be used instead of the scalar product, and any method capable of calculating the similarity of the two first pixel features may be used. In addition, in a case where a set of pixels is composed of three pixels, determination of consistency or inconsistency can be performed on any two pixels selectable from the three pixels, for example. In this case, there are eight possible results of the classification process as illustrated in FIG. 5. However, when the first pixel features are qualitative values such as cluster numbers or category numbers, (b1), (b2) and (b3) in FIG. 5 are impossible, and thus, the number of possible results of the classification process is five. Needless to say, a well-known clustering technique or classification technique may be used instead of the consistency determination. Furthermore, the number of results of the classification process may be reduced by integrating some of the eight possible results illustrated in FIG. 5. For example, if the results in which one or more of the combinations of two pixels are consistent are integrated, the number of possible results of the classification process will be two, which are: (a), (b1), (b2), (b3), (c1), (c2) and (c3); and (d). Alternatively, a well-known clustering technique or classification technique may be applied to the first pixel features of the three pixels without selecting two pixels out of the three pixels. This can be implemented by applying the clustering technique or the classification technique after combining the first pixel features of the three pixels into a feature data having a triple length, for example. In addition, note that the first pixel features of all the pixels are not necessarily be used when a set of pixels is composed of three or more pixels.

Figure 6:
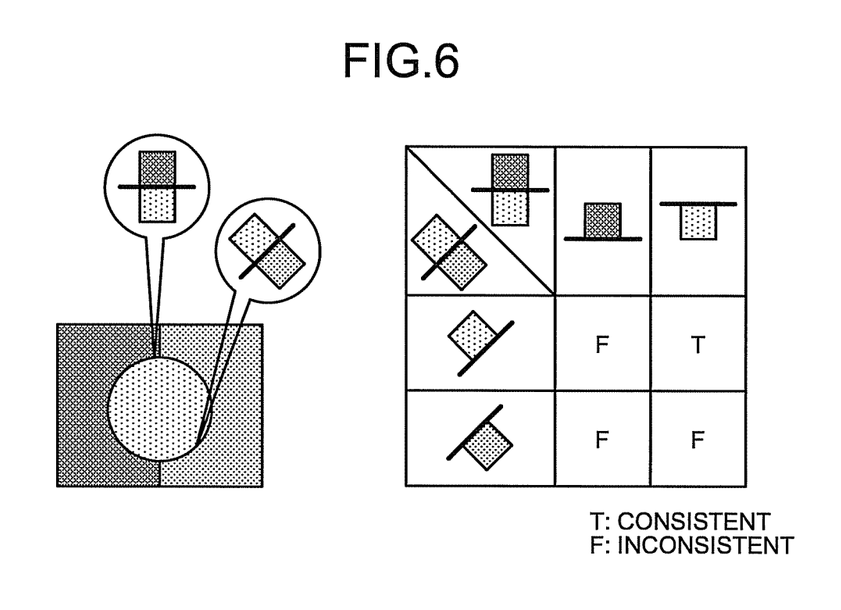
FIG. 6 is a diagram illustrating an example of results of consistency determination on two pixels.

When the first pixel features include a plurality of qualitative and quantitative values, the classification process may be performed on each of the values and the results thereof may be used as the results of the classification process using the first pixel features. FIG. 6 is a diagram illustrating an example in which, in a case where the first pixel features are pixel values of both pixels adjacent to an edge and a set for which the co-occurrence relation is to be examined includes two pixels, the consistency of the pixel values that are the first pixel features is determined for each set. It can be seen that the two pixels are determined to be consistent only when a pixel on one side of the edge is in a circle and to be inconsistent otherwise. Since the consistency of two first pixel features of each of two pixels are determined between the two pixels, the number of possible results of the classification process using the first pixel features is 2 (combinations of pixels) to the power of 2 (the number of first pixel features)×2 (consistent or inconsistent)=16. In this case, the number of possible results may be made smaller than 16 by integrating some of the sixteen possible results.

Figure 1:
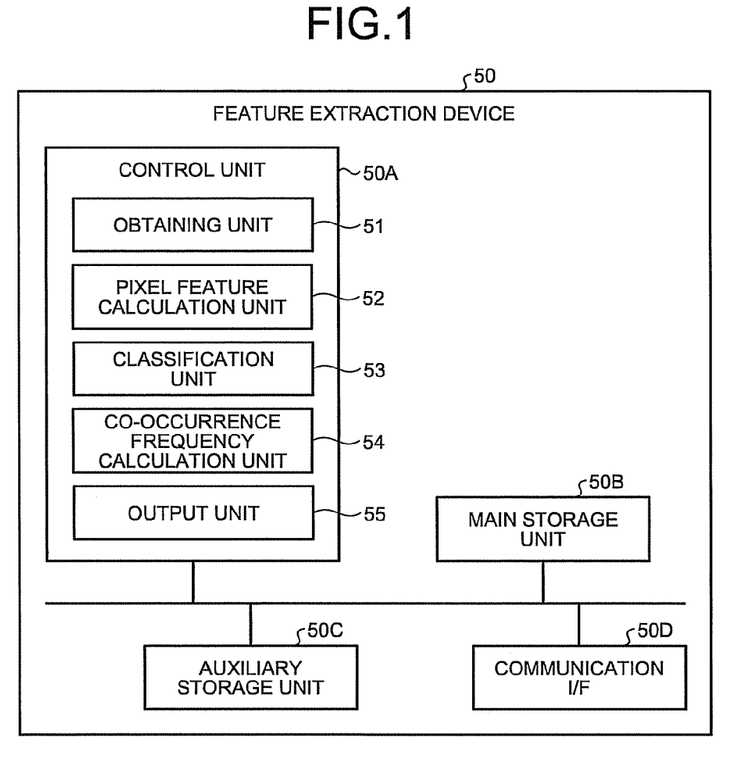
FIG. 1 is a diagram illustrating a configuration of a feature extraction device according to a first embodiment.

The description refers back to FIG. 1. The co-occurrence frequency calculation unit 54 calculates a co-occurrence frequency representing the frequency of co-occurrence of the second pixel features of pixels included in each of sets of pixels for which the same result of the classification process performed by the classification unit 53 is obtained. One representation of the co-occurrence frequency is a co-occurrence histogram. Details of a method for calculating the co-occurrence frequency will be described later. The output unit 55 outputs the co-occurrence frequency calculated by the co-occurrence frequency calculation unit 54.

Next, procedures of a feature extraction process performed by the feature extraction device 50 according to this embodiment will be described referring to FIG. 7. In step S1, the obtaining unit 51 of the feature extraction device 50 obtains image data I(r) to be processed. In step S2, the pixel feature calculation unit 52 calculates the first pixel features f1(r) and the second pixel features f2(r) that are different from each other for the image data I(r) obtained in step S1. In step S3, the control unit 50A performs the processes of steps S3 and S4 for all the pixels included in a target region set in the image data I(r) obtained in step S1. In step S3, the classification unit 54 performs the classification process of classifying a set of a pixel included in the target region and N pixels included in the image data I(r) obtained in step S1 by using the first pixel features calculated by the pixel feature calculation unit 52. The result of the classification process is a discrete value. In step S4, the co-occurrence frequency calculation unit 54 calculates the co-occurrence frequency representing a frequency of co-occurrence of the second pixel features of the pixels included in the set by using the result of the classification process of step S3 and the second pixel features calculated in step S2. A co-occurrence histogram is used herein as a representation of the co-occurrence frequency calculated by using the result of the classification process of step S3. In the co-occurrence histogram, bins are arranged in units of the value of the second pixel features on (N+1)-dimensional coordinates where (N+1) is the number of pixels included in the set for which the co-occurrence relation is to be examined.

Specifically, in step S40, the co-occurrence frequency calculation unit 54 determines whether or not to add the co-occurrence frequency based on the result of the classification process of step S3. The criterion for determining whether or not to add the co-occurrence frequency is determined in advance according to the classification process, and stored in the auxiliary storage unit 50C, for example. For example, in a case where the sets for which the co-occurrence relation is to be examined each include two pixels, the first pixel features are pixel values and the classification process is to classify a set according to whether the pixel values of the two pixels are consistent or inconsistent, a determination criterion that the co-occurrence frequency of the second pixel features is to be added if a set is classified to be inconsistent is defined in advance. Obviously, it may be determined to add the co-occurrence frequency only when the pixel values are determined to be consistent, or it may be determined to add the co-occurrence frequency both when the pixel values are determined to be consistent and when the pixel values are determined to be inconsistent.

Figure 8:
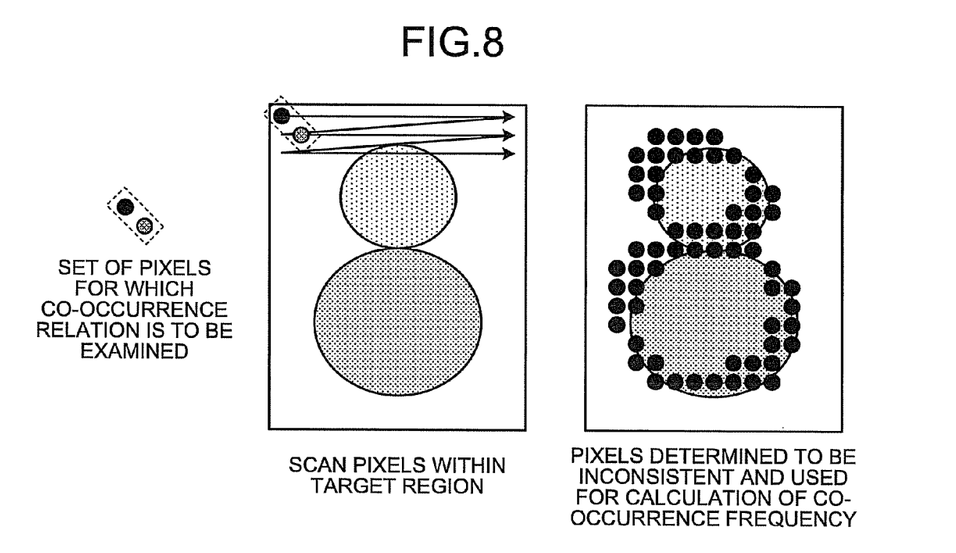
FIG. 8 is a diagram explaining pixels to which a co-occurrence frequency is to be added.
Figure 9:
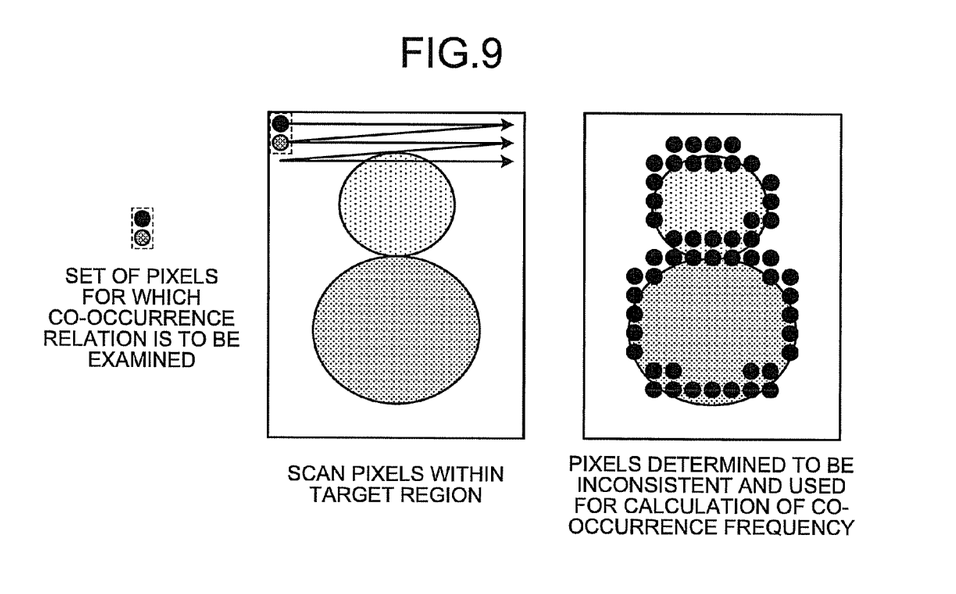
FIG. 9 is a diagram explaining pixels to which a co-occurrence frequency is to be added.
Figure 10:
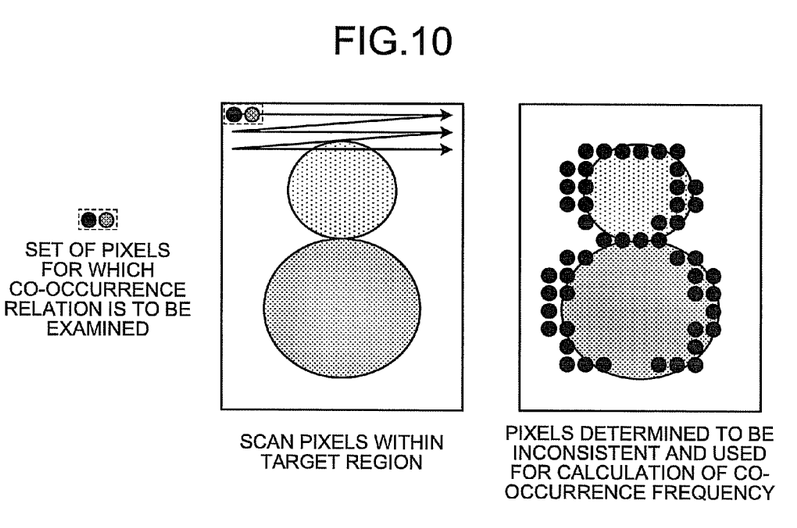
FIG. 10 is a diagram explaining pixels to which a co-occurrence frequency is to be added.

FIGS. 8 to 10 are diagrams explaining pixels to which the co-occurrence frequency is to be added when a set of pixels for which the co-occurrence relation is to be examined includes two pixels. In a left box in each of FIGS. 8 to 10, a pixel (a pixel corresponding to the position coordinates r0) included in a target region is represented by a black circle and another pixel (a pixel corresponding to the position coordinates r1) with which the co-occurrence relation of the aforementioned pixel is to be examined is represented by a gray circle. In FIG. 8, an example in which the mapping g1 described above is parallel translation to the right obliquely downward and two pixels for which the co-occurrence relation is to be examined are arranged obliquely is illustrated. In FIG. 9, an example in which the mapping g1 is downward parallel translation and two pixels for which the co-occurrence relation is to be examined are arranged vertically is illustrated. In FIG. 10, an example in which the mapping g1 is parallel translation to the right and two pixels for which the co-occurrence relation is to be examined are arranged horizontally is illustrated. In each of the examples, the classification process is performed on such a set of pixels for all the pixels included in the target region. A right box in each of FIGS. 8 to 10 illustrates each of the results. In FIGS. 8 to 10, pixels (pixels corresponding to the position coordinates r0) out of the sets classified to be inconsistent and included in the target regions are represented by black circles. Note that the pixels (small black circular points) determined to be added with the co-occurrence frequency are different as illustrated in FIGS. 8 to 10. According to this embodiment, the results of the classification process adaptively vary and the pixels to be added with the co-occurrence frequency are different depending on the way the sets of pixels for which the co-occurrence relations are to be examined are set.

Figure 7:
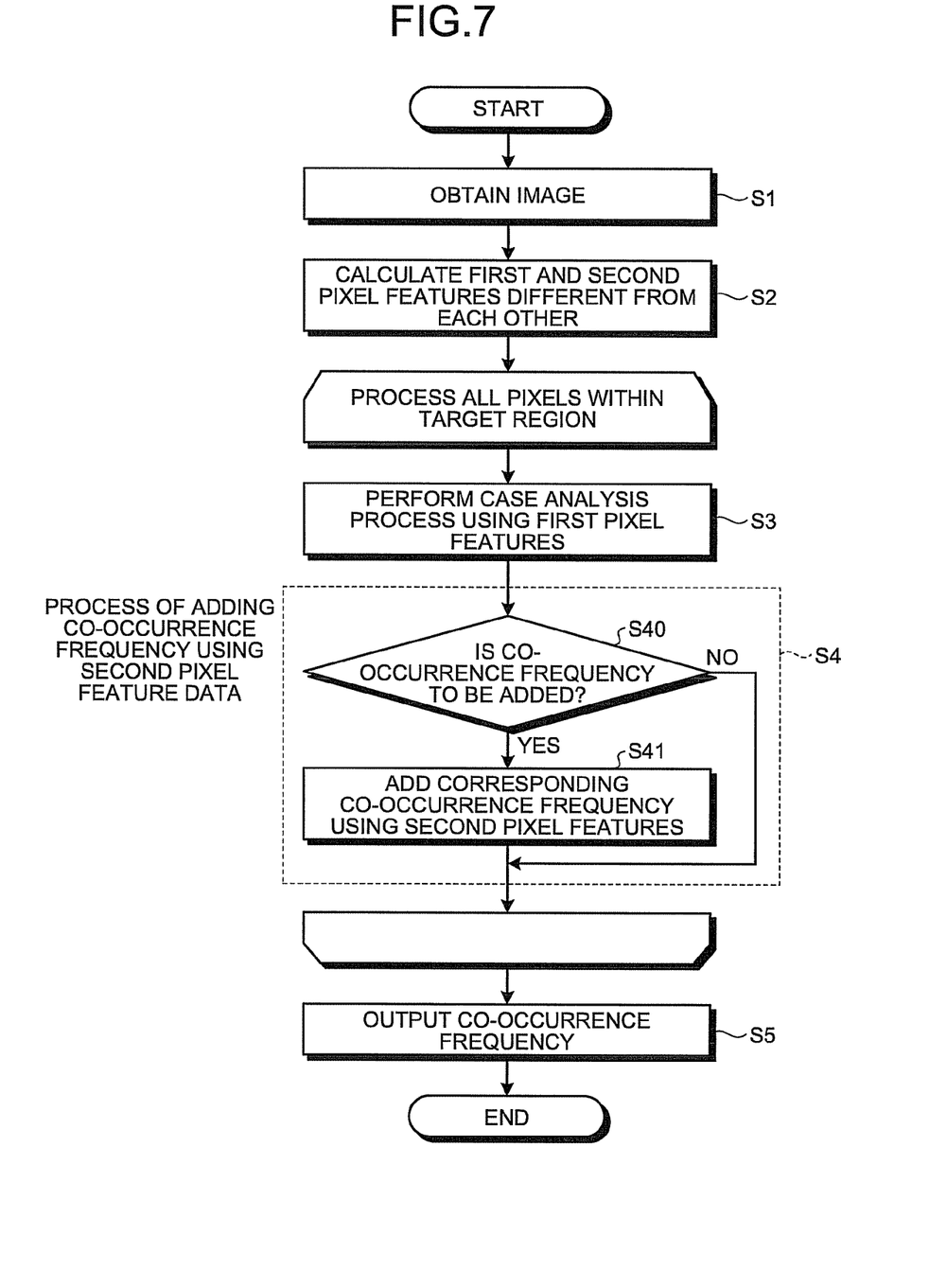
FIG. 7 is a flowchart illustrating procedures of a feature extraction process.

The description refers back to FIG. 7. If the co-occurrence frequency calculation unit 54 determines in step S40 that the co-occurrence frequency is to be added, the co-occurrence frequency calculation unit 54 adds, in step S41, a predetermined value (1, for example) to a bin (referred to as a corresponding bin) corresponding to coordinate values on (N+1)-dimensional coordinates, where the second pixel features $f2(r0), \ldots, f2(rN)$ of the pixels included in the sets to be processed in a co-occurrence histogram representing the co-occurrence frequency calculated by using the result of the classification process in step S3 are coordinate values on the (N+1)-dimensional coordinates. The co-occurrence histogram is represented by an equation 2, for example.

$$h(a_0, a_1, \ldots, a_N; m, g_1, \ldots, g_N) = \sum_{r_0 \in D(m, g_1, \ldots, g_N)} \prod_{i=0}^{N} \text{equal}(f_2(r_i), a_i) \quad (2)$$

for $a_i = 0, \ldots, L-1 (i = 0, \ldots, N)$

Note that $D(m, g1, \ldots, gN)$ represents a set representing the whole pixels for which the results of the classification process in step S3 are m among the pixels included in the target region. For example, in a case where the sets for which the co-occurrence relation is to be examined each include two pixels, the first pixel features are pixel values, the classification process is to classify a set according to whether the pixel values of the two pixels are consistent or inconsistent, and a determination criterion that the co-occurrence frequency of the second pixel features is to be added if a set is classified to be inconsistent is defined in advance, it is determined that "m=inconsistent". L represents a quantization level of the second pixel features f2(r). In addition, the function equal ( ) is expressed by an equation (3).

$$\text{equal}(a, b) = \begin{cases} 1 & \text{if } a = b \\ 0 & \text{otherwise} \end{cases} \quad (3)$$

Figure 11:
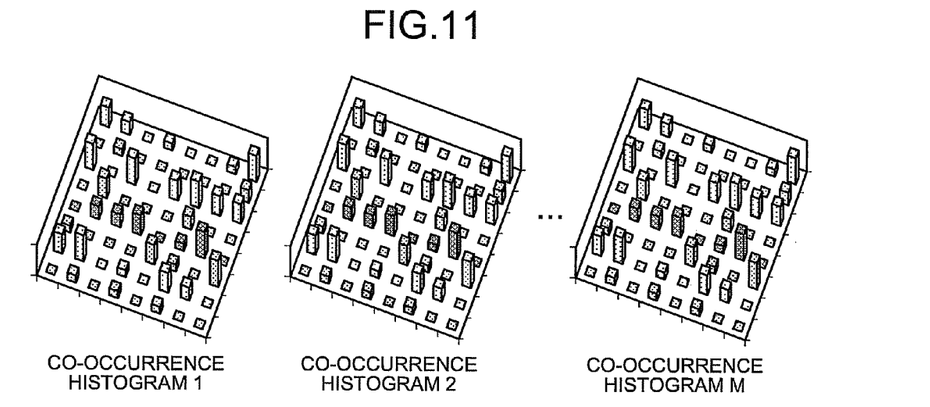
FIG. 11 is a diagram illustrating co-occurrence histograms.

Accordingly, when there are M possible results of the classification process in step S3, up to M co-occurrence histograms can be calculated as illustrated in FIG. 11. Furthermore, when a plurality of target regions is set, several times more co-occurrence histograms than the set target regions can be calculated. In addition, when a plurality of sets of maps g1, . . . , gN giving sets of pixels are used, several times more co-occurrence histograms than the used sets of maps can be calculated. Note that the co-occurrence frequency is not limited to the co-occurrence histogram of the equation (2) but may be a weighted co-occurrence histogram setting a weight when being added to the corresponding bin, for example.

In step S5, the output unit 55 outputs the co-occurrence frequency calculated in step S4 as a feature data (step S5).

As described above, the classification process is performed by using the first pixel features different from the second pixel features used for calculation of the co-occurrence frequency, and the co-occurrence frequency representing the frequency of co-occurrence of the second pixel features of the pixels included in each of the sets of the pixels for which the same results of the classification process is obtained is calculated. As a result, up to the number, which corresponds to the number of types of possible results of the classification process, of the co-occurrence frequencies can be calculated, and a feature data with better discriminative power than that in the related art can be extracted. For example, when the feature data is used to learn an object detector or an object classifier, higher detection performance or classification performance than that in the related art can be obtained.

[Second Embodiment]

Next, a second embodiment of a feature extraction device will be described. Parts that are the same as those in the first embodiment described above will be described using the same reference numerals and description thereof will not be repeated.

Figure 12:
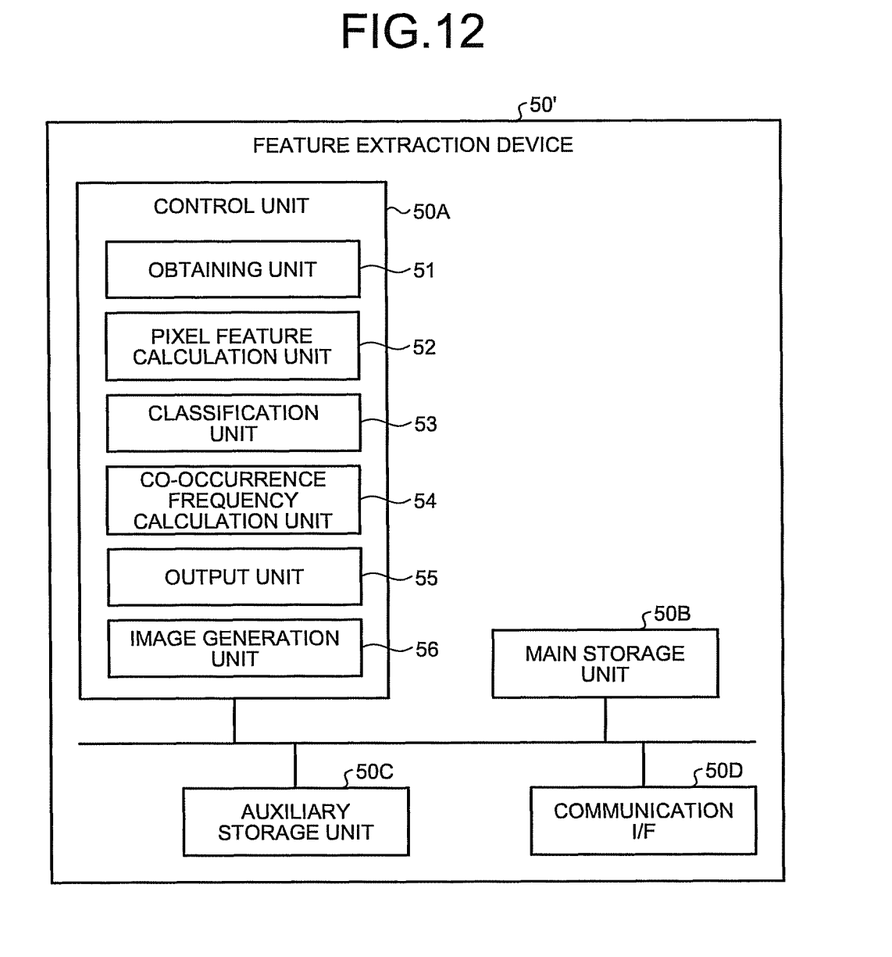
FIG. 12 is a diagram illustrating a functional configuration of a feature extraction device according to a second embodiment.

FIG. 12 is a diagram illustrating a functional configuration of a feature extraction device 50' according to this embodiment. A control unit 50A according to this embodiment further includes an image generation unit 56 in addition to an obtaining unit 51, a pixel feature calculation unit 52, a classification unit 53, a co-occurrence frequency calculation unit 54, and an output unit 55. The configurations of the obtaining unit 51, the pixel feature calculation unit 52, the classification unit 53 and the output unit 55 are similar to those in the first embodiment described above.

The image generation unit 56 generates image data (referred to as classified image data) having the results of the classification process performed by the classification unit 53 as pixel values. For example, in a case where the sets for which the co-occurrence relation is to be examined each include two pixels, the first pixel features are pixel values and the classification process is to classify a set according to whether the pixel values of the two pixels are consistent or inconsistent, the image generation unit 56 generates classified image data having a pixel value 1 when the result is inconsistent and a pixel value 0 when the result is consistent.

The output unit 55 calculates the co-occurrence frequency representing the frequency of co-occurrence of the second pixel features of the pixels included in a set for the sets of pixels with the same pixel value in the classified image data generated by the image generation unit 56.

Figure 13:
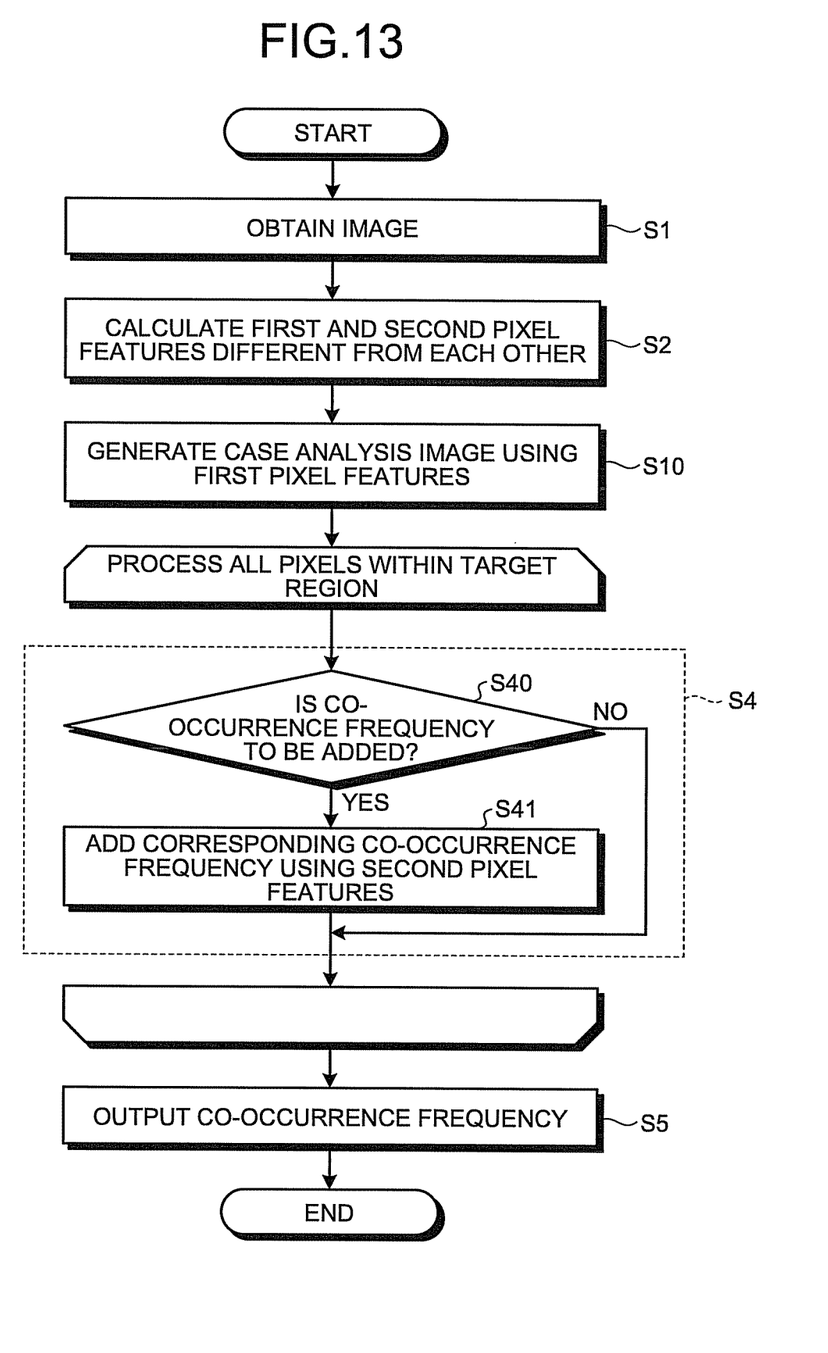
FIG. 13 is a flowchart illustrating procedures of a feature extraction process.
Figure 14:
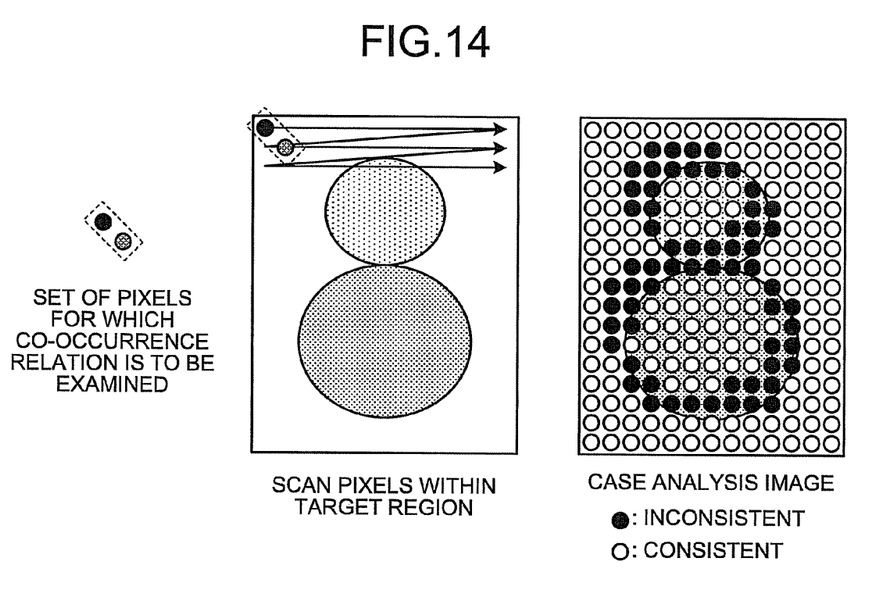
FIG. 14 is a diagram illustrating an image represented by classified image data.

Next, procedures of a feature extraction process performed by the feature extraction device 50' according to this embodiment will be described referring to FIG. 13. Steps S1 and S2 are similar to those in the first embodiment described above. In step S10, the image generation unit 56 generates classified image data having the result of the classification process using the first pixel features as the pixel value for all the pixels included in the target region set in the image data I(r) obtained in step S1. Note that, when there are a plurality of sets of maps giving sets of pixels for which the co-occurrence relation is to be examined, the process of generating classified image data, which will be described later, only needs to be performed the number of times corresponding to the number of mappings, and therefore the process of generating classified image data will be described assuming that one set of maps is used herein. Note that the classified image data are data representing the result of the classification process by associating the results of the classification process one-to-one with the pixel values. However, the pixels of the classified image data are associated with the pixels (position coordinates r0) included in the target region, but are not associated with N pixels (position coordinates r1, . . . , rN, respectively) included in the image data to be processed. Thus, the N pixels (position coordinates r1, . . . , rN, respectively) included in the image data may be used for calculation of the co-occurrence frequency even when the pixels are expressed as not being used for calculation of the co-occurrence frequency in the classified image data. FIG. 14 is a diagram illustrating an image represented by classified image data generated in a case where a set for which the co-occurrence relation is to be examined includes two pixels and the classification process is to classify the pixel values of the two pixels to be consistent or inconsistent. In FIG. 14, each of pixels included in the target region among the pixels in the sets classified to be consistent is represented by a white circle, and each of pixels included in the target region among the pixels in the sets classified to be inconsistent is represented by a black circle. Note that, in this embodiment, the classified image data representing the results of the classification process as image data adaptively vary and the pixels to be added with the co-occurrence frequency are different depending on the way the sets of pixels for which the co-occurrence relations are to be examined are set.

In step S4, the co-occurrence frequency calculation unit 54 calculates the co-occurrence of the second pixel features by using the classified image data generated in step S10. Note that, when there are a plurality of classified image data pieces, the process of calculating the co-occurrence frequency described below only needs to be repeated the number of times corresponding to the number of the classified image data pieces, and therefore the process of calculating the co-occurrence frequency will be described assuming that the number of the classified image data pieces is one. First, the co-occurrence frequency calculation unit 54 refers to the classified image data and obtains pixel values of pixels of the classified image data associated with pixels included in a target region. As a result, the co-occurrence frequency calculation unit 54 obtains the result of the classification process of the pixels included in the target region. Then the co-occurrence frequency calculation unit 54 determines whether or not to add the co-occurrence frequency according to a predetermined determination criterion and adds a corresponding bin in a co-occurrence histogram based on the determination result similarly to the first embodiment described above. Step S5 is similar to that in the first embodiment described above.

As described above, in this embodiment, the result of the classification process performed by using the first pixel features different from the second pixel features used for calculation of the co-occurrence frequency is generated as classified image data, and the co-occurrence frequency representing the frequency of co-occurrence of the second pixel features of the pixels included in each of the sets of the pixels having the same pixel values in the classified image data is calculated. As a result, up to the number, which corresponds to the number of possible values of the pixels in the classified image data, of the co-occurrence frequencies can be calculated, and a feature data with better discriminative power than that in the related art can be extracted. For example, when the feature data is used to learn an object detector or an object classifier, higher detection performance or classification performance than that in the related art can be obtained.

[Modified Examples]

In the embodiments described above, various programs executed in the feature extraction device 50 may be stored on a computer system connected to a network such as the Internet, and provided by being downloaded via the network. The various programs may also be recorded on a computer readable recording medium such as a CD-ROM, a flexible disk (FD), a CD-R and a digital versatile disk (DVD) in a form of a file that can be installed or executed, and provided as a computer program product.

Moreover, in the embodiments described above, other pixels with which the co-occurrence relations of pixels included in a target region are a predetermined distance away from the pixels in the target regions in a predetermined direction, but the invention is not limited thereto. Furthermore, a plurality of predetermined directions and a plurality of predetermined distances may be set, and the co-occurrence frequency calculation unit 54 may calculate the co-occurrence frequency for each of the different predetermined directions and predetermined distances.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A feature extraction device comprising:
a memory that stores a computer executable unit;
a processor configured to execute the computer executable unit stored in the memory;
an obtaining unit stored in the memory and executed by the processor, and configured to obtain image data having a plurality of pixels;
a pixel feature calculation unit configured to calculate two features for each of the pixels, the two features being a first feature and a second feature of each of the pixels, the first feature and the second feature being different from each other;
a classification unit configured to classify pairs of pixels by using the first feature into sets as classified sets for at least some of the plurality of pixels,
each pair including a first pixel and a second pixel; and
a co-occurrence frequency calculation unit configured to calculate a co-occurrence frequency representing a frequency of co-occurrence of the second feature of the first pixel and the second feature of the second pixel for pairs belonging to a same classified set.

2. The device according to claim 1, wherein
the first feature and the second feature are a predetermined distance away from each other in a predetermined direction,
a plurality of directions and a plurality of distances are set for the predetermined distance and the predetermined direction in advance, and
the co-occurrence frequency calculation unit calculates the co-occurrence frequency for each of the predetermined directions and each of the predetermined distances.

3. The device according to claim 2, wherein
the co-occurrence frequency calculation unit calculates the co-occurrence frequency for each of one or more target regions set in the image data.

4. The device according to claim 3, further comprising an image generation unit configured to generate classified image data by associating each of the pairs in the classified set unit one-to-one with a pixel value, wherein
the co-occurrence frequency calculation unit calculates a co-occurrence frequency representing a frequency of co-occurrence of the second feature of the first pixel and the second feature of the second pixel for each pair, in which pixel values are equal to each other, included in the classified image data.

* * * * *